C. A. LINDEN.
CASTER.
APPLICATION FILED DEC. 12, 1910.
984,824.
Patented Feb. 21, 1911.
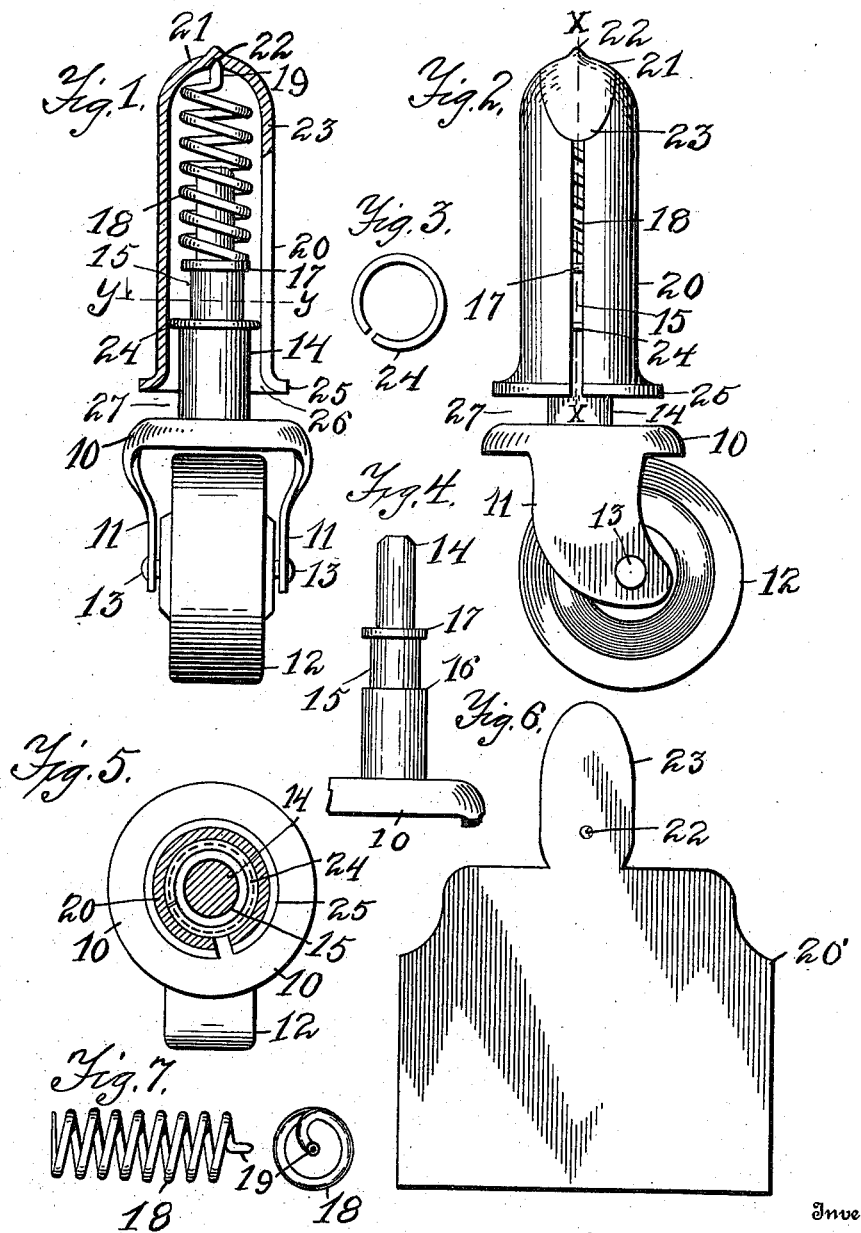

UNITED STATES PATENT OFFICE.

CHARLES A. LINDEN, OF JAMESTOWN, NEW YORK, ASSIGNOR TO SHERIDAN R. FETCH, OF CORRY, PENNSYLVANIA.

CASTER.

984,824.  Specification of Letters Patent.  Patented Feb. 21, 1911.

Application filed December 12, 1910. Serial No. 596,780.

*To all whom it may concern:*

Be it known that I, CHARLES A. LINDEN, a citizen of the United States, residing at Jamestown, in the county of Chautauqua and State of New York, have invented new and useful Improvements in Casters, of which the following, taken in connection with the accompanying drawings, is a specification.

The invention relates to casters and more particularly to caster frames or portion of said caster which supports the caster wheel; and the object of the improvement is to provide a resilient pintle and a tubular socket for said resilient pintle and means for retaining said pintle within said socket with freedom of resilient movement; and the invention consists in the construction and arrangement of the parts as shown in this specification and accompanying drawings and pointed out in the claims.

In the drawings, Figure 1 is an elevation of the caster with the tubular socket in section at line X X in Fig. 2. Fig. 2 is a side elevation of the caster with the tubular socket in normal position. Fig. 3 is a plan view of the spring retaining ring. Fig. 4 is an elevation of the supporting pin or pintle of the caster frame. Fig. 5 is a crosswise sectional view at line Y Y in Fig. 1. Fig. 6 is a plan view of the sheet metal blank as shaped for forming into the tubular socket or holder for resiliently mounting the pintle. Fig. 7 shows side and end elevations of the spring for the upper end of the pintle.

Similar numerals refer to like parts in the several views.

The numeral 10 indicates the metallic saddle or bridge piece of the caster frame which is formed with two downwardly extending legs 11 which are connected to the caster wheel 12 by a crosswise pin 13. The saddle 10 of the caster frame supports on its upper side the pintle or pin 14 which has a portion 15 cut away to form the annular shoulder 16 and annular projection or boss 17. The upper end of the cutaway portion 15 is limited by the projection 17 which provides a shoulder on its upper and under sides similar to annular shoulder 16. The reduced pintle 14 extends above the projection 17 a sufficient distance to support thereon the coil spring 18. The lower end of coil spring 18 rests upon the upper side of projection 17 and the upper end of the spring 18 extends above pin 14 a considerable portion of its length to allow free resilient movement. The coil spring 18 is formed with its upper end 19 centrally placed vertically turned and pointed, which arrangement provides a spinning point for the caster within the hole in a piece of furniture to which the caster is attached. When the furniture is made of metal it is apparent that the hole for the reception of the resilient pintle may be provided the correct depth to receive said pintle and the metal upper end of the hole will provide a solid bearing for the end 19 of spring 18. The depth of said hole is preferably made about one quarter inch less than the entire length of the pintle 14 with a spring 18 thereon so as to allow a space 27 for the resilient upward and downward movement of the piece of furniture. If, however, the piece of furniture be of wood a suitable socket or tubular holder 20 should be provided which has a closed upper end 21 and within the center of the inner side of which a prick point 22 is preferably provided to receive therein the pointed upper end 19 of spring 18. The tubular socket or holder 20 is preferably made from a flat sheet of metal, as shown in Fig. 6, with a tongue 23 which laps across the upper end of the holder into the cut away portions thereby closing said upper end and providing a bearing surface for end 19 of spring 18 and on the inner side of which the prick point 22 may be made before the holder is given the tubular form and tongue 23 is bent down over the same. The lower end of tube 20 is bent outwardly in a projecting flange 25 which provides a gradually enlarging inner surface 26 to receive and press inwardly on a spring retaining ring 24, when the same is pressed up within the holder 20. When the pintle 14 with spring 18 and retaining ring 24 is used in a solid retaining member, as for example, in the casting of a foot of metallic bedpost, the hole for said pintle and spring should be reamed out around the lower end to correspond to the part 26 of tube 20 so that the spring retaining ring 24 may be pressed into the hole and will adjust itself automatically to the inner circumference of the hole the length of the hole within the tube 20, or for the pintle and spring, should be of such a length as to normally hold the tube 20 above saddle piece 10 a sufficient distance, as indicated at 27 to allow for the resilient movement of the tube 20 and the supported piece of furniture.

In addition to spring 18 a locking ring 24 is sprung over the projection 17 and into the cutaway portion 15 of pin 14. The spring ring 24 fits loosely around the cutaway portion 15 and thereby slides up and down on said cutaway portion with perfect freedom. The spring ring 24 fits so tightly within the tubular holder 20 or the hole for the resilient pintle that the pintle is retained firmly in position upon the piece of furniture so that the caster may spin freely upon point 19, turning instantly in any desired direction. The cutaway portion 15 of pintle 14 allows spring 24 to pass freely up and down the pintle 14, the length of the cutaway portion 15 being made according to the desired resilient up and down movement, the length of the spring 18 being proportioned accordingly.

I claim as new:

1. In a caster, a resilient pintle, a portion of said pintle reduced in size and having shoulders at each end of said reduced portion, and a spring locking ring for said pintle mounted on said reduced portion with freedom of upward and downward movement for said pintle within said locking ring.

2. In a caster, a furniture supporting pintle, a spring on the upper end of said pintle, said pintle cut away below said spring, and a spring ring around said cutaway portion to lock said pintle with freedom of movement within the hole in the furniture.

3. In caster attaching devices for furniture having a suitable hole, a caster frame, a pintle on said frame shorter than the length of said hole, said pintle having a reduced upper end, a coil spring on said reduced upper end, said coil spring having a vertically upturned end to bear against the wall at the upper end of said hole.

4. In caster attaching devices for furniture having a suitable hole, a caster frame, a pintle on said frame shorter than the length of said hole, said pintle having a reduced upper end, a coil spring on said reduced upper end of said pintle, said coil spring having a vertically upturned end to bear against the wall at the upper end of said hole, said pintle having a reduced portion below said spring with shoulders at each end, and a spring locking ring for said pintle in said hole mounted on said reduced portion with freedom of upward and downward movement for said pintle.

5. In caster attaching devices for furniture, a caster pintle having a pointed upper end, a sheet metal socket for said caster pintle, a tongue of said sheet metal formed over the top of said socket to receive said pointed end of said pintle, substantially as and for the purpose specified.

In testimony whereof I have signed my name to this specification in the presence of two subscribing witnesses.

CHARLES A. LINDEN.

Witnesses:
A. L. FURLOW,
I. A. ELLSWORTH.